(12) United States Patent
Hu et al.

(10) Patent No.: US 11,204,488 B2
(45) Date of Patent: Dec. 21, 2021

(54) LENS SYSTEM AND IMAGING DEVICE

(71) Applicant: ZHEJIANG DAHUA TECHNOLOGY CO., LTD., Zhejiang (CN)

(72) Inventors: Changtao Hu, Hangzhou (CN); Kai Liu, Hangzhou (CN); Faguan Lin, Hangzhou (CN); Hongxing Ding, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 57 days.

(21) Appl. No.: 16/808,575

(22) Filed: Mar. 4, 2020

(65) Prior Publication Data

US 2020/0201006 A1 Jun. 25, 2020

Related U.S. Application Data

(63) Continuation of application No. PCT/CN2018/103872, filed on Sep. 4, 2018.

(30) Foreign Application Priority Data

Sep. 4, 2017 (CN) .......................... 201710786947.3

(51) Int. Cl.
    *G02B 15/14* (2006.01)
(52) U.S. Cl.
    CPC ............................ *G02B 15/145129* (2019.08)

(58) Field of Classification Search
    CPC ................ G02B 15/145113; G02B 15/145129
    See application file for complete search history.

(56) References Cited

U.S. PATENT DOCUMENTS

| 5,677,792 A | 10/1997 | Hamano |
| 5,687,026 A | 11/1997 | Sato |

(Continued)

FOREIGN PATENT DOCUMENTS

| CN | 1167268 A | 12/1997 |
| CN | 103487913 A | 1/2014 |

(Continued)

OTHER PUBLICATIONS

International Search Report in PCT/CN2018/103872 dated Nov. 28, 2018, 5 pages.

(Continued)

*Primary Examiner* — Darryl J Collins
(74) *Attorney, Agent, or Firm* — Metis IP LLC

(57) ABSTRACT

The present disclosure relates to a lens system and an imaging device including the lens system. The lens system may include a first lens group, a second lens group, a third lens group, a fourth lens group, and a fifth lens group in sequence from an object side to an image side along an optical axis of the lens system. At least one of the first lens group, the second lens group, the third lens group, the fourth lens group, and the fifth lens group may be adjustable along (Continued)

the optical axis of the lens system to adjust a focal length of the lens system. The lens system may satisfy $$a \leq \frac{f_2}{(f_w \cdot f_t)^{1/2}} \leq b, c \leq \frac{f_3}{(f_w \cdot f_t)^{1/2}} \leq d, e \leq \frac{f_4}{(f_w \cdot f_t)^{1/2}} \leq f.$$

19 Claims, 11 Drawing Sheets

(56) References Cited

U.S. PATENT DOCUMENTS

| | | | |
|---|---|---|---|
| 5,694,252 A | | 12/1997 | Yahagi |
| 2006/0066952 A1 | | 3/2006 | Ohtake |
| 2007/0279760 A1 | | 12/2007 | Toyoda et al. |
| 2008/0212184 A1 | | 9/2008 | Ohtake |
| 2008/0231962 A1 | | 9/2008 | Yamada |
| 2009/0086334 A1 | | 4/2009 | Take |
| 2009/0168193 A1 | | 7/2009 | Suzaki et al. |
| 2013/0021674 A1 | | 1/2013 | Fujikura |
| 2015/0085153 A1* | | 3/2015 | Souma ............ G02B 15/145113 348/220.1 |
| 2015/0124127 A1* | | 5/2015 | Iwashita ................ G02B 15/16 348/240.3 |
| 2017/0075093 A1 | | 3/2017 | Sashima et al. |
| 2017/0115472 A1* | | 4/2017 | Obama ............... G02B 27/0025 |
| 2017/0261728 A1* | | 9/2017 | Shibata ........... G02B 15/145129 |
| 2019/0018221 A1* | | 1/2019 | Yamazoe ............ G02B 27/0062 |

FOREIGN PATENT DOCUMENTS

| | | |
|---|---|---|
| CN | 104049347 B | 6/2016 |
| CN | 106125273 A | 11/2016 |
| CN | 205880341 U | 1/2017 |
| JP | H0478809 A | 3/1992 |
| JP | 2017142468 A | 8/2017 |
| WO | 2019042452 A1 | 3/2019 |

OTHER PUBLICATIONS

Written Opinion in PCT/CN2018/103872 dated Nov. 28, 2018, 6 pages.
First Office Action in Chinese Application No. 201710786947.3 dated Feb. 22, 2019, 12 pages.
The Second Office Action in Chinese Application No. 201710786947.3 dated Jun. 21, 2019, 9 pages.
Partial European Search Report in European Application No. 18851395.6 dated Jul. 6, 2020, 11 pages.
Extended European Search Report in European Application No. 18851395.6 dated Sep. 25, 2020, 13 pages.

* cited by examiner

LENS SYSTEM AND IMAGING DEVICE

CROSS-REFERENCE TO RELATED APPLICATIONS

This application is a continuation of International Application No. PCT/CN2018/103872, filed on Sep. 4, 2018, which claims priority of Chinese Patent Application No. 201710786947.3, filed on Sep. 4, 2017, the contents of each of which are incorporated herein by reference.

TECHNICAL FIELD

This disclosure generally relates to optical devices, and more particularly, to a lens system and an imaging device with the lens system.

BACKGROUND

Lenses play an important role in the field of security monitoring. The lenses in a camera receive rays that are reflected by an object and project the rays to an imaging sensor in the camera to generate an image of the object. The performance of the lenses may affect the image quality, which may affect the accuracy of the result in the security monitoring. The apertures and image planes of some existing lenses used in the security monitoring are relatively small, and the existing lenses cannot achieve a constant aperture, which decreases the image quality. Therefore, it is desirable to provide a lens system that can achieve a relatively large constant aperture and a relatively large image plane.

SUMMARY

According to an aspect of the present disclosure, a lens system may comprise a first lens group, a second lens group, a third lens group, a fourth lens group, and a fifth lens group in sequence from an object side to an image side along an optical axis of the lens system. At least one of the first lens group, the second lens group, the third lens group, the fourth lens group, and the fifth lens group may be adjustable along the optical axis of the lens system to adjust a focal length of the lens system. The lens system may satisfy $$a \leq \frac{f_2}{(f_w \cdot f_t)^{1/2}} \leq b, c \leq \frac{f_3}{(f_w \cdot f_t)^{1/2}} \leq d, e \leq \frac{f_4}{(f_w \cdot f_t)^{1/2}} \leq f,$$

wherein a, b, c, d, e, and f are constants, $f_2$ represents a focal length of the second lens group, $f_3$ represents a focal length of the third lens group, $f_4$ represents a focal length of the fourth lens group, $f_w$ represents a focal length of the lens system at a wide-angle end, and $f_t$ represents a focal length of the lens system at a telephoto end.

In some embodiments, the lens system may satisfy $$-1.33 \leq \frac{f_2}{(f_w \cdot f_t)^{\frac{1}{2}}} \leq -1.03, 1.56 \leq \frac{f_3}{(f_w \cdot f_t)^{\frac{1}{2}}} \leq 1.86, 1.21 \leq \frac{f_4}{(f_w \cdot f_t)^{\frac{1}{2}}} \leq 1.51.$$

In some embodiments, the first lens group may have positive refractive power, the second lens group may have negative refractive power, the third lens group may have positive refractive power, the fourth lens group may have positive refractive power, and the fifth lens group may have positive refractive power.

In some embodiments, the first lens group may include a first meniscus lens having negative refractive power, a biconvex lens having positive refractive power, and a second meniscus lens having positive refractive power in sequence from the object side to the image side along the optical axis of the lens system. Each of the first meniscus lens and the second meniscus lens may be with a convex surface toward the object side of the lens system.

In some embodiments, the second lens group may include a first lens having negative refractive power, a biconcave lens having negative refractive power, and a second lens having positive refractive power in sequence from the object side to the image side along the optical axis of the lens system. The first lens may be with a concave surface toward the image side of the lens system, and the second lens may be with a convex surface toward the object side of the lens system.

In some embodiments, the third lens group may include a first lens sub-group having positive refractive power, a second lens sub-group, and a third lens sub-group in sequence from the object side to the image side along the optical axis of the lens system.

In some embodiments, the first lens sub-group may include a first biconvex lens having positive refractive power, a biconcave lens having negative refractive power, and a second biconvex lens having positive refractive power that are cemented together in sequence from the object side to the image side along the optical axis of the lens system. The second lens sub-group may include a biconcave lens having negative refractive power and a biconvex lens having positive refractive power that are cemented together in sequence from the object side to the image side along the optical axis of the lens system. The third lens sub-group may include a biconvex lens having positive refractive power and a biconcave lens having negative refractive power that are cemented together in sequence from the object side to the image side along the optical axis of the lens system.

In some embodiments, the first lens sub-group may include a biconvex lens having positive refractive power and a meniscus lens having positive refractive power in sequence from the object side to the image side along the optical axis of the lens system. The second lens sub-group may include a biconcave lens having negative refractive power and a biconvex lens having positive refractive power that are cemented together in sequence from the object side to the image side along the optical axis of the lens system. The third lens sub-group may include a biconvex lens having positive refractive power and a biconcave lens having negative refractive power that are cemented together in sequence from the object side to the image side along the optical axis of the lens system.

In some embodiments, an object-side surface of the meniscus lens in the first lens sub-group may be a convex surface.

In some embodiments, an object-side surface of the meniscus lens in the first lens sub-group may be a concave surface, and the biconvex lens and the meniscus lens in the first lens sub-group may be cemented together.

In some embodiments, the fourth lens group may include a biconvex lens having positive refractive power and a fourth lens sub-group in sequence from the object side to the image side along the optical axis of the lens system.

In some embodiments, the fourth lens sub-group may include a biconcave lens having negative refractive power and a biconvex lens having positive refractive power that are cemented together in sequence from the object side to the image side along the optical axis of the lens system.

In some embodiments, the fifth lens group may include a third meniscus lens having negative refractive power and a fourth meniscus lens having positive refractive power in sequence from the object side to the image side along the optical axis of the lens system. Each of the third meniscus lens and the fourth meniscus lens may be with a convex surface toward the object side of the lens system.

In some embodiments, lenses in the lens system may be spherical lenses.

In some embodiments, the lens system may include at least one aspherical lens.

In some embodiments, the lens system may further comprise an aperture stop between the second lens group and the third lens group.

In some embodiments, a size of an image plane of the lens system based on the first lens group, the second lens group, the third lens group, the fourth lens group, and the fifth lens group may be greater than a threshold.

In some embodiments, a maximum aperture corresponding to focal lengths from the wide-angle end to the telephoto end may be constant based on the first lens group, the second lens group, the third lens group, the fourth lens group, and the fifth lens group.

In some embodiments, the second lens groups and the fourth lens group may be adjustable along the optical axis of the lens system to adjust a focal length of the lens system.

According to another aspect of the present disclosure, an imaging device may comprise a lens system. The lens system may comprise a first lens group, a second lens group, a third lens group, a fourth lens group, and a fifth lens group in sequence from an object side to an image side along an optical axis of the lens system. At least one of the first lens group, the second lens group, the third lens group, the fourth lens group, and the fifth lens group may be adjustable along the optical axis of the lens system to adjust a focal length of the lens system. The lens system may satisfy $$a \leq \frac{f_2}{(f_w \cdot f_t)^{1/2}} \leq b, c \leq \frac{f_3}{(f_w \cdot f_t)^{1/2}} \leq d, e \leq \frac{f_4}{(f_w \cdot f_t)^{1/2}} \leq f,$$

wherein a, b, c, d, e, and f are constants, $f_2$ represents a focal length of the second lens group, $f_3$ represents a focal length of the third lens group, $f_4$ represents a focal length of the fourth lens group, $f_w$ represents a focal length of the lens system at a wide-angle end, and $f_t$ represents a focal length of the lens system at a telephoto end.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
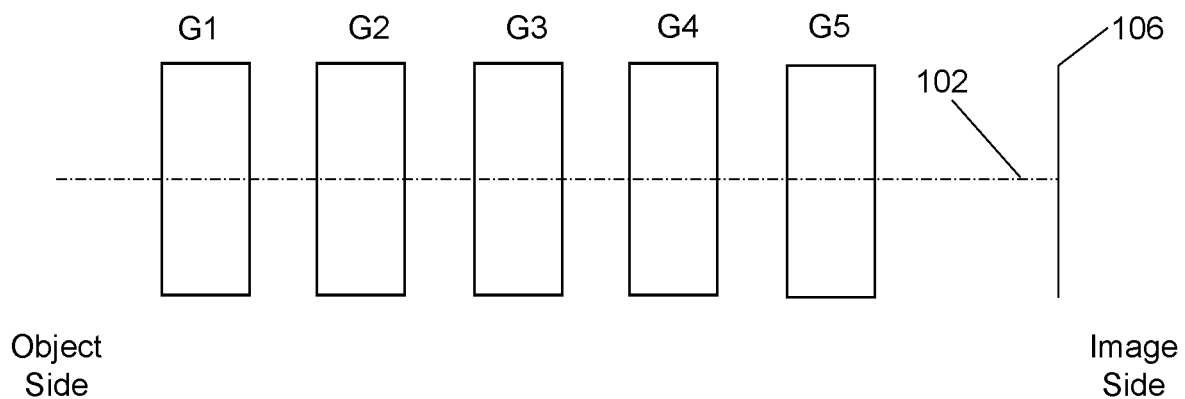
FIG. 1 is a schematic diagram illustrating an exemplary lens system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure, however, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Technical solutions of the embodiments of the present disclosure be described with reference to the drawings as described below. It is obvious that the described embodiments are not exhaustive and are not limiting. Other embodiments obtained, based on the embodiments set forth in the present disclosure, by those with ordinary skill in the art without any creative works are within the scope of the present disclosure.

FIG. 1 is a schematic diagram illustrating an exemplary lens system according to some embodiments of the present disclosure.

As shown in FIG. 1, the lens system 100 may include a first lens group G1, a second lens group G2, a third lens group G3, a fourth lens group G4, a fifth lens group G5, and an image plane 106 in sequence from an object side to an image side along an optical axis 102 of the lens system 100. As used herein, the image plane 106 refers to a plane that is vertical to the optical axis 102 and includes an object's projected image generated based on the lens system 100. In some embodiments, a lens group (e.g., G1-G5) may include one or more lenses. In some embodiments, at least one of G1, G2, G3, G4, and G5 may be adjustable along the optical axis 102 of the lens system 100 to change the magnification (i.e., adjust the focal length) of the lens system 100. For example, G1, G3, and G5 may be fixed relative to the image plane 106 during the magnification change of the lens system 100. G2 and G4 may be adjustable along the optical axis 102 of the lens system 100 to adjust the focal length of the lens system 100. In this case, G1, G3, and G5 may be referred to as first fixed lens group, second fixed lens group, and third fixed lens group, respectively. G2 may be referred to as zoom lens group and G4 may be referred to as focusing lens group.

As described above, the lens system 100 may have different working states (e.g., having different focal lengths). For example, the lens system 100 may be at a telephoto end when it is focused on an object at a maximum focal length of its zoom range. As another example, the lens system 100 may be at a wide-angle end when it is focused on an object at a minimum focal length of its zoom range.

In some embodiments, the focal lengths of the lens system lens 100 may satisfy formulas (1)-(3) below:

$$a \leq \frac{f_2}{(f_w \cdot f_t)^{1/2}} \leq b, \quad (1)$$

$$c \leq \frac{f_3}{(f_w \cdot f_t)^{1/2}} \leq d, \quad (2)$$

$$e \leq \frac{f_4}{(f_w \cdot f_t)^{1/2}} \leq f, \quad (3)$$

wherein a, b, c, d, e, and f are constants, $f_2$ represents the focal length of G2, $f_3$ represents the focal length of G3, $f_4$ represents the focal length of G4, $f_w$ represents the focal length of the lens system 100 at a wide-angle end, and $f_t$ represents the focal length of the lens system 100 at a telephoto end.

In some embodiments, a, b, c, d, e, and f may be set as specific values to ensure the size of the lens system 100 and/or the correction of aberrations, such as spherical aberration, coma aberration, astigmatism, field curvature, distortion, axial chromatic aberration, or lateral chromatic aberration.

Merely by way of example, a may be equal to −1.33, b may be equal to −1.03, c may be equal to 1.56, d may be equal to 1.86, e may be equal to 1.21, and f may be equal to 1.51. Therefore, the focal lengths of the lens system lens 100 may satisfy formulas (4)-(6) below:

$$-1.33 \leq \frac{f_2}{(f_w \cdot f_t)^{\frac{1}{2}}} \leq -1.03, \quad (4)$$

$$1.56 \leq \frac{f_3}{(f_w \cdot f_t)^{\frac{1}{2}}} \leq 1.86, \quad (5)$$

$$1.21 \leq \frac{f_4}{(f_w \cdot f_t)^{\frac{1}{2}}} \leq 1.51. \quad (6)$$

Taking formula (5) as an example, above the upper limit of formula (5), refractive power of G3 may be too weak, leading to an increase of the size of G3 (e.g., the diameter of the maximum cross-section vertical to the optical axis 102 of at least one lens in G3). Below the lower limit of formula (5), the refractive power of G3 may be too strong, making the aberrations of the lens system 100 produced at different focal lengths (e.g., the focal lengths varying from the wide-angle end to the telephoto end) difficult to be corrected. The refractive power (also referred to as optical power) refers to the degree to which an optical system (e.g., the lens system 100) converges or diverges light (also referred to as rays). For example, if the optical system has positive refractive power, the optical system may converge the incident light of the optical system. If the optical system has negative refractive power, the optical system may diverge the incident light of the optical system. The larger the absolute value of the refractive power is, the larger the degree to which the optical system may converge or diverge the incident light.

In some embodiments, with the action of G1, G2, G3, G4, and G5, and/or the values of a, b, c, d, e, and f in formulas (1)-(3), the size of the image plane 106 of the lens system 100 may be relatively large, the maximum aperture corresponding to different focal lengths (e.g., the focal lengths varying from the wide-angle end to the telephoto end) may be constant, and the size of the maximum aperture may be relatively large. For example, the size of the image plane may be ⅔ inch. The size of the maximum aperture may be F1.5.

In some embodiments, G1 may have positive refractive power, G2 may have negative refractive power, G3 may have positive refractive power, G4 may have positive refractive power, and G5 may have positive refractive power. It should be noted that the refractive power of G1-G5 described above is merely some examples or implementations. For persons having ordinary skills in the art, on the premise that the focal lengths of the lens system lens 100 satisfies formulas (4)-(6), the refractive power of G1-G5 in the present disclosure may be other combinations.

In some embodiments, the lens system 100 may include at least one aspherical lens. In some embodiments, the lenses in the lens system 100 may be spherical lenses, which brings the benefits of low cost, high stability, suitability for mass production.

In some embodiments, the lens system 100 may also include one or more aperture stops (not shown in FIG. 1). The aberrations (e.g., spherical aberration, astigmatism, distortion) of the lens system 100 may be reduced by placing one or more aperture stops in a specific location along the optical axis 102. In some embodiments, the lens system 100 may also include one or more color filters (not shown in FIG. 1) configured to correct color deviation of light incident to the lens system 100.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
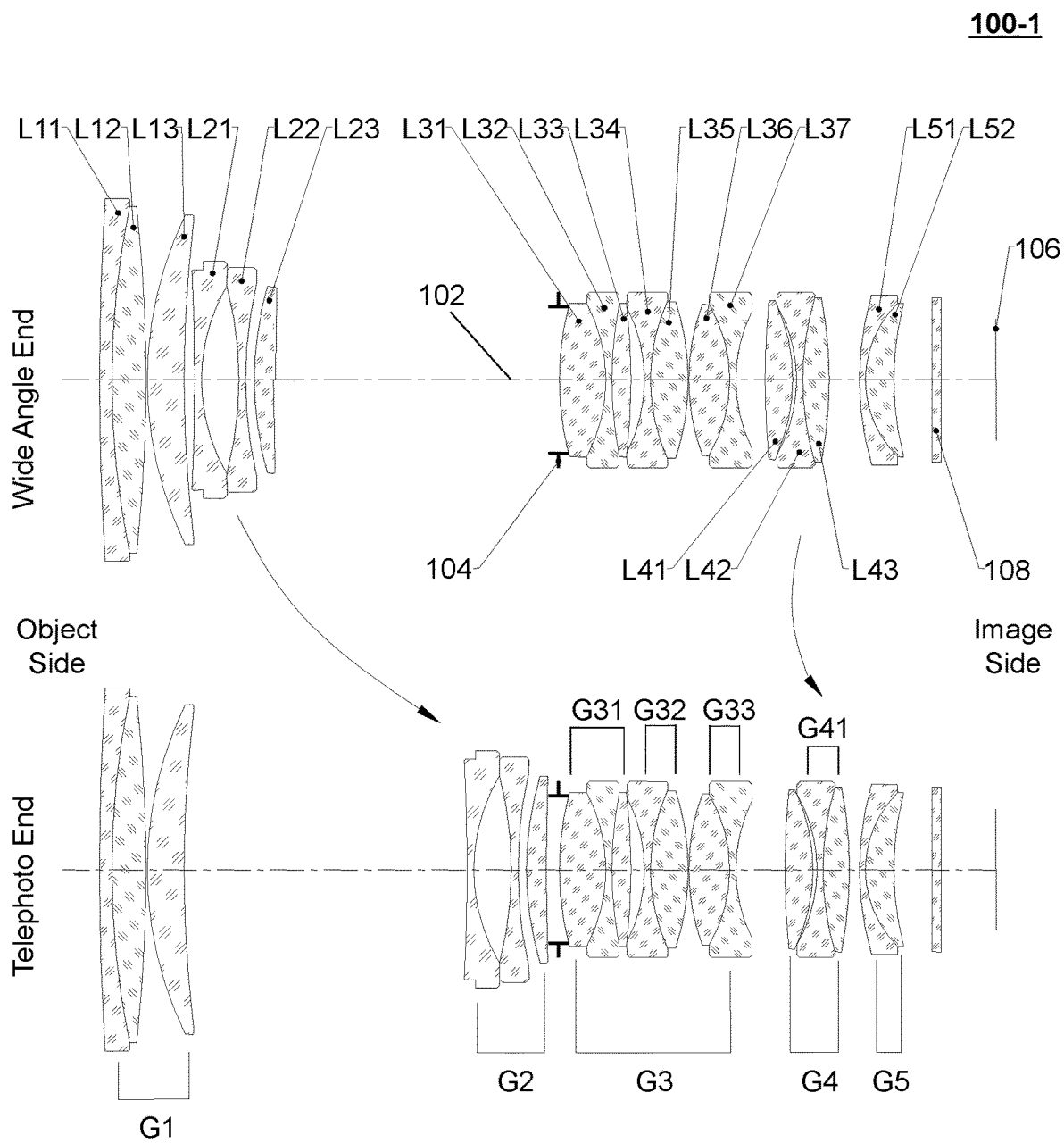
FIG. 2 is a schematic diagram illustrating an exemplary lens system according to some embodiments of the present disclosure.

FIG. 2 is a schematic diagram illustrating an exemplary lens system according to some embodiments of the present disclosure. In some embodiments, the lens system 100-1 in FIG. 2 may be an example of the lens system 100 in FIG. 1.

As shown in FIG. 2, the lens system 100-1 may include a first lens group G1 having positive refractive power, a second lens group G2 having negative refractive power, an aperture stop 104, a third lens group G3 having positive refractive power, a fourth lens group G4 having positive refractive power, a fifth lens group G5 having positive refractive power, and one or more color filters 108 in sequence from an object side to an image side along an optical axis 102 of the lens system 100-1. In the lens system 100-1, G1, G3, and G5 may be fixed relative to the image plane 106 during the magnification change of the lens system 100-1, and G2 and G4 may be adjustable along the optical axis 102 of the lens system 100-1 to adjust the focal length of the lens system 100-1. As shown in FIG. 2, the lens system 100-1 may limit a first adjusting line for adjusting G2 along the optical axis 102 and a second adjusting line for adjusting G4 along the optical axis 102. When G2 is adjusted along the optical axis 102 to the object-side end of the first adjusting line and G4 is adjusted along the optical axis 102 to the object-side end of the second adjusting line, the lens system 100-1 may be at the wide-angle end. When G2 is adjusted along the optical axis 102 to the image-side end of the first adjusting line and G4 is adjusted along the optical axis 102 to the image-side end of the second adjusting line, the lens system 100-1 may be at the telephoto end. In some embodiments, the focal lengths of the lens system lens 100-1 may satisfy formulas (4)-(6).

Taking the embodiment in which the lenses in the lens system 100-1 are spherical lenses as an example, G1 may include a first meniscus lens L11 having negative refractive power, a biconvex lens L12 having positive refractive power, and a second meniscus lens L13 having positive refractive power in sequence from the object side to the image side along the optical axis 102 of the lens system 100-1. Each of L11 and L13 may be with a convex surface toward the object side (e.g., a convex object-side surface) of the lens system 100-1. A meniscus lens is a lens having two spherically curved surfaces, one convex and the other concave. A meniscus lens having positive refractive power (e.g., L13 in FIG. 2) may be thicker in the middle than at the edges and serve as a converging lens. A meniscus lens having negative refractive power (e.g., L11 in FIG. 2) may be thicker at the edges than in the middle and serve as a diverging lens.

In some embodiments, two or more lens may be cemented together. For example, the cementation of a lens having the positive refractive power (e.g., L12) and a lens having the negative refractive power (e.g., L11) may reduce aberrations of the lens system 100, such as spherical aberration, astigmatism, axial chromatic aberration, etc. In some embodiments, L11 and L12 may be cemented together (e.g., as shown in FIG. 2) or not be cemented together.

In some embodiments, G2 may include a first lens L21 having negative refractive power, a biconcave lens L22 having negative refractive power, and a second lens L23 having positive refractive power in sequence from the object side to the image side along the optical axis 102 of the lens system 100-1. L21 may be with a concave surface toward the image side (also referred to as image-side surface) of the lens system 100. The surface of L21 toward the object side of the lens system 100 (e.g., the object-side surface of L21) may be a concave surface, a convex surface, or a plane surface. For example, L21 may be a biconcave lens (e.g., as shown in FIG. 2), a plano-concave lens with a concave image-side surface and a plane object-side surface, or a meniscus lens with a concave image-side surface and a convex object-side surface. L23 may be with a convex surface toward the object side (e.g., a convex object-side surface) of the lens system 100-1. The surface of L23 toward the image side (e.g., the image-side surface) of the lens system 100 may be a concave surface, a convex surface, or a plane surface. For example, L23 may be a biconvex lens, a plano-convex lens with a convex object-side surface and a plane image-side surface, or a meniscus lens (e.g., as shown in FIG. 2) with a convex object-side surface and a concave image-side surface.

In some embodiments, G3 may include a first lens sub-group G31 having positive refractive power, a second lens sub-group G32, and a third lens sub-group G33 in sequence from the object side to the image side along the optical axis 102 of the lens system 100-1. A sub-group (e.g., G31-G33 and G41) may include one or more lenses. For example, each of G32 and G33 may include a lens having negative refractive power and a lens having positive refractive power that are cemented together.

G31 may include a first biconvex lens L31 having positive refractive power, a biconcave lens L32 having negative refractive power, and a second biconvex lens L33 having positive refractive power that are cemented together in sequence from the object side to the image side along the optical axis 102 of the lens system 100-1. G32 may include a biconcave lens L34 having negative refractive power and a biconvex lens L35 having positive refractive power that are cemented together in sequence from the object side to the image side along the optical axis 102 of the lens system 100-1. G33 may include a biconvex lens L35 having positive refractive power and a biconcave lens L36 having negative refractive power that are cemented together in sequence from the object side to the image side along the optical axis 102 of the lens system 100-1.

In some embodiments, G4 may include a biconvex lens L41 having positive refractive power and a fourth lens sub-group G41 in sequence from the object side to the image side along the optical axis 102 of the lens system 100-1. G41 may include a lens having negative refractive power and a lens having positive refractive power that are cemented together. For example, G41 may include a biconcave lens L42 having negative refractive power and a biconvex lens L43 having positive refractive power that are cemented together in sequence from the object side to the image side along the optical axis 102 of the lens system 100-1.

In some embodiments, G5 may include a third meniscus lens L51 having negative refractive power and a fourth meniscus lens L52 having positive refractive power in sequence from the object side to the image side along the optical axis 102 of the lens system 100-1. Each of L51 and L52 may be with a convex surface toward the object side (e.g., a convex object-side surface) of the lens system 100-1. L51 and L52 may be cemented together.

In some embodiments, exemplary optical parameters of G1, G2, the aperture stop 104, G3, G4, G5, and the one or more color filters 108 in the lens system 100-1 are illustrated in Table 1.

TABLE 1

Optical parameters of optical elements in the lens system 100-1

| Surface Number | Radius of Curvature R (mm) | Surface Distance $T_c$ (mm) | Refractive Index $N_d$ | Abbe Number $V_d$ |
|---|---|---|---|---|
| 1 | 546.38 | 2.25 | 1.847 | 23.785 |
| 2 | 154.69 | 6.23 | 1.593 | 67.002 |
| 3 | −289.84 | 0.2 | | |
| 4 | 68.48 | 6.7 | 1.593 | 68.624 |
| 5 | 243.27 | 1.95 (W)-51.66 ($T_{tele}$) | | |
| 6 | −382.99 | 1.2 | 1.755 | 52.329 |
| 7 | 33.82 | 6.85 | | |
| 8 | −67.03 | 1.2 | 1.497 | 81.608 |
| 9 | 76 | 1.63 | | |
| 10 | 59.8 | 3.56 | 1.954 | 32.319 |
| 11 | 482.82 | 52.17 (W)-2.46 ($T_{tele}$) | | |
| 12 (aperture stop) | 55.75 | 8.46 | 1.593 | 68.624 |
| 13 | −29.78 | 1.1 | 1.728 | 28.311 |
| 14 | 74.68 | 3.44 | 1.946 | 17.984 |
| 15 | −116.14 | 2.44 | | |
| 16 | −29.25 | 1.1 | 1.648 | 33.842 |
| 17 | 35.1 | 6.86 | 2.001 | 29.135 |
| 18 | −46.46 | 0.15 | | |
| 19 | 40.04 | 7.44 | 1.55 | 75.496 |
| 20 | −27.18 | 1.1 | 1.728 | 28.311 |
| 21 | 28.45 | 5.34 (W)-9.02 ($T_{tele}$) | | |
| 22 | 152.88 | 5.12 | 1.755 | 52.329 |
| 23 | −33.58 | 0.71 | | |
| 24 | −27.72 | 1.1 | 1.728 | 28.311 |
| 25 | 52.03 | 4.85 | 1.954 | 32.319 |
| 26 | −77.38 | 5.49 (W)-1.8 ($T_{tele}$) | | |
| 27 | 54.8 | 1.1 | 1.728 | 28.311 |
| 28 | 19.74 | 5.2 | 1.911 | 35.25 |
| 29 | 55.8 | 6.87 | | |
| 30 (color filter) | Infinity | 1.7 | 1.517 | 64.212 |
| 31 | Infinity | 10 | | |
| 32 (image plane) | Infinity | / | | |

Each lens in the lens system 100-1 may include two surfaces, an object-side surface and an image-side surface. As shown in Table 1, each value in the column of "Surface Number" represents the serial number of each surface of the lenses in the lens system 100-1, wherein "1" in the column of "Surface Number" represents the serial number of the object-side surface of L11 and the serial number is sequentially increased toward the image side. If two lenses are cemented together, the cemented surfaces may have a same surface number. For example, "2" in the column of "Surface Number" in Table 1 represents the cemented surfaces of L11 and L12 (e.g., the image-side surface of L11 and the object-side surface of L12 in FIG. 2).

Each value in the column of "Radius of Curvature R (mm)" represents the radius of curvature of a corresponding lens surface. Each value in the column of "Surface Distance Tc (mm)" represents the distance along the optical axis 102 between a corresponding lens surface and the next lens surface. For example, "2.25" in the column of "Surface Distance Tc (mm)" represents the distance along the optical axis 102 between lens surface 1 (e.g., the object-side surface of L11) and lens surface 2 (e.g., the cemented surfaces of L11 and L12) is 2.25 mm. As used herein, "W" in the present disclosure represents the wide-angle end of a lens system (e.g., the lens system 100, the lens system 100-1, the lens system 100-2), and "$T_{tele}$" in the present disclosure represents the telephoto end of the lens system. Different focus lengths of the lens system 100-1 may correspond to different locations of G2 and G4 along the optical axis 102 and different distances between G2 (or G4) and the adjacent lens group. For example, the distance between lens surface 5 (e.g., the image-side surface of L13 in FIG. 2) and lens surface 6 (e.g., the object-side surface of L21 in FIG. 2) is 1.95 mm (e.g., represented as "1.95 (W)" in the column of "Surface Distance Tc (mm)") when the lens system 100-1 is at the wide-angle end. The distance between lens surface 5 and lens surface 6 is 51.66 mm (e.g., represented as "51.66 ($T_{tele}$)" in the column of "Surface Distance Tc (mm)") when the lens system 100-1 is at the telephoto end.

Each value in the column of "Refractive Index Nd" in Table 1 represents the refractive index of the medium between a corresponding lens surface and the next lens surface. Each value in the column of "Abbe Number Vd" in Table 1 represents the Abbe number of the medium between a corresponding lens surface and the next lens surface. The Abbe number may be a measure of a medium's dispersion (variation of refractive index versus wavelength), with high values indicating low dispersion. The refractive index and the Abbe number of a lens may depend on the material of the lens.

In some embodiments, the optical parameters of the optical elements in the lens system 100-1 may be important to correct the aberrations of the lens system 100-1. For example, spherical aberration and coma aberration of the lens system 100-1 may be reduced by adjusting the refractive indexes (e.g., by changing the material of the optical elements) and/or the radiuses of curvature of the optical elements in the lens system 100-1. As another example, lateral chromatic aberration of the lens system 100-1 may be reduced by adjusting the surface distances of the optical elements in the lens system 100-1.

According to the structure of the lens system 100-1 illustrated in FIG. 2 and the optical parameters illustrated in Table 1, the lens system 100-1 may have the optical performance below:

Total Track Length (TTL)≤163 mm;
Focal length f': 20 mm (W, wide-angle end)-70 mm ($T_{tele}$, telephoto end);
Field of View (FOV): 56.5° (W)-18.3° ($T_{tele}$);
Optical Distortion: −9.5% (W)-+0.87% ($T_{tele}$);
Aperture F/#: F1.5 (constant aperture); and
Image Plane Size: ⅔ inch.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the values of the radius of curvature, the surface distance, the refractive index, the Abbe number of each lens in the lens system 100-1 are not limited to the values shown in Table 1 and may take different values.

Figure 3A:
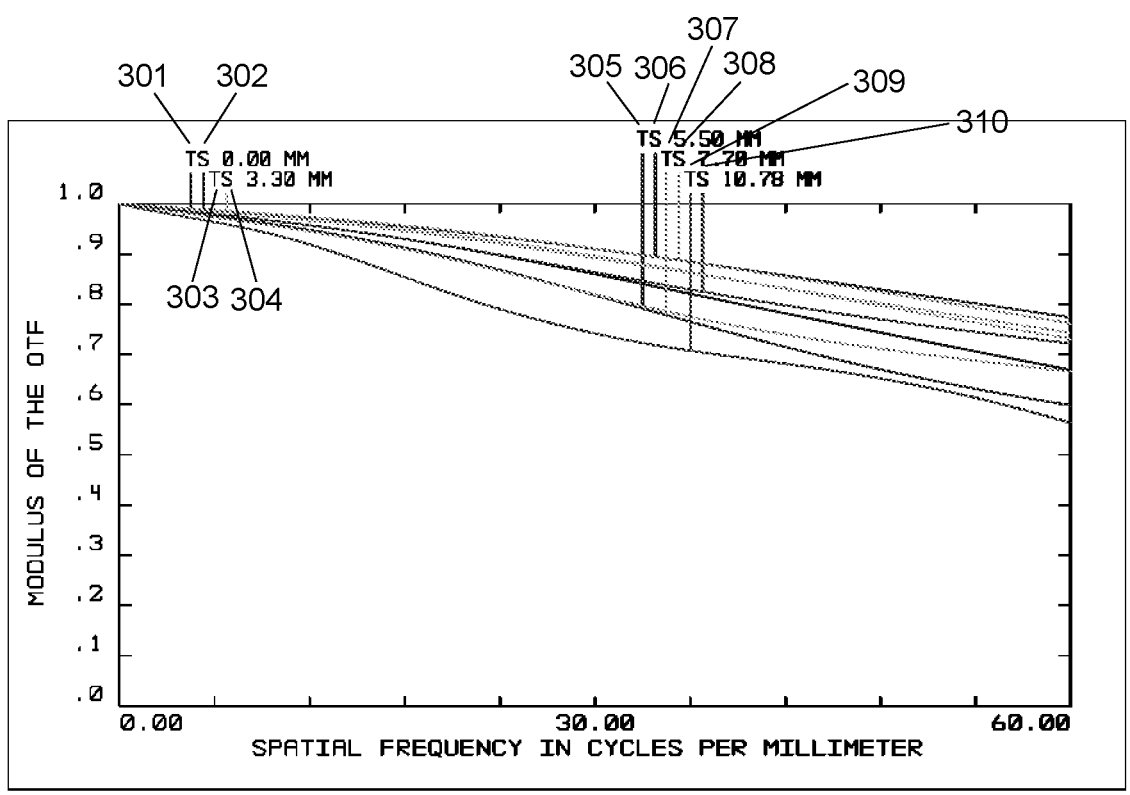
FIGS. 3A and 3B are schematic diagrams of modulation transfer function (MTF) curve of an exemplary lens system at a wide-angle end and a telephoto end, respectively, according to some embodiments of the present disclosure.
Figure 3B:
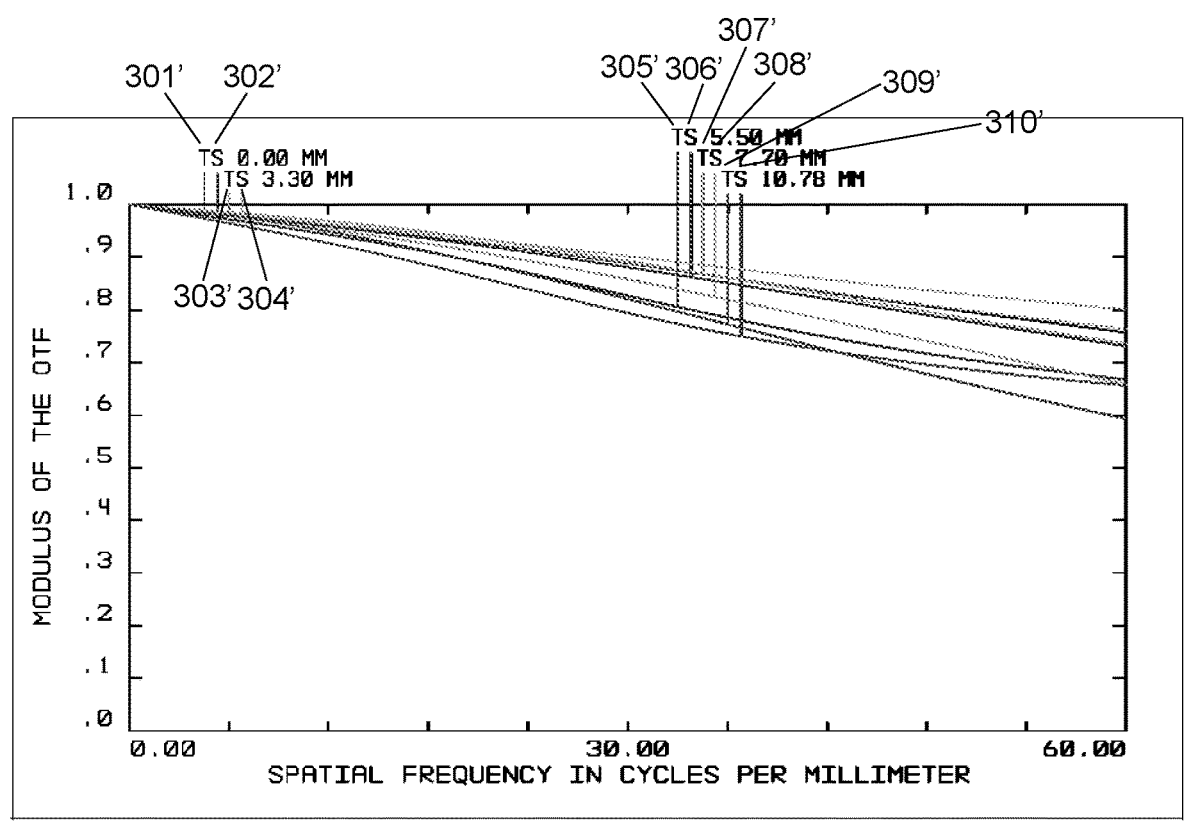

FIGS. 3A and 3B are schematic diagrams of modulation transfer function (MTF) curve of the lens system 100-1 at a wide-angle end and a telephoto end, respectively, according to some embodiments of the present disclosure.

In some embodiments, a diagram of MTF curve of a lens system may assess the imaging quality of the lens system.

During the process of generating the MTF curve, one or more patterns each of which includes a plurality of stripes in black alternating with white may be captured using the lens system 100-1. In a pattern, the density of the black and white stripes may be represented by "spatial frequency" in line pairs per millimeter (lp/mm). Each line pair may include a black strip and the adjacent white stripe. The density of the black and white stripes in a pattern may be constant or varying. The difference between the captured pattern and the image of the captured pattern may be measured and quantified by the MTF value. The larger the MTF value is, the less the difference between the captured pattern and the image of the captured pattern may be. The MTF may be the modulus of the optical transfer function (OTF). In some embodiments, the pattern may be placed in a circle (e.g., the field of view of the lens system 100-1) along the radial direction (e.g., the black and white stripes are parallel to a radial direction of the circle, or the black and white stripes radiate outwards from the center of the circle) and/or the tangential direction (e.g., the black and white stripes are vertical to a radial direction of the circle, or the black and white stripes are concentric circles of the circle). In some embodiments, the MTF values corresponding to different spatial frequencies at a location in the circle may be determined. The MTF curves may be generated based on the MTF values. The MTF curve generated based on the pattern along the radial direction may be referred to as a sagittal MTF curve. The MTF curve generated based on the pattern along the tangential direction may be referred to as a tangential MTF curve. A same location in the circle may correspond to two MTF curves, i.e., the sagittal MTF curve and the tangential MTF curve.

In some embodiments, the higher the location of an MTF curve is in the diagram (which indicates that the area under the MTF curve is larger) and the smoother the MTF curve is, the better the imaging quality of the lens system may be. The more similar the MTF curves at the wide-angle end and at the telephoto end are and the larger the average of the MTF values of the full field of view (e.g., when the spatial frequency is equal to 60 lp/mm as shown in FIG. 3A and/or FIG. 3B) is, the better the imaging quality of the lens system in the entire zoom focal length may be and the better the lens system may correct the aberrations, such as spherical aberration, coma aberration, astigmatism, field curvature, distortion, axial chromatic aberration, or lateral chromatic aberration.

As shown in FIGS. 3A and 3B, the MTF curves are the MTF curves of visible light of which the wavelength is 0.4350 μm-0.65 μm. The horizontal axis represents spatial frequency in circles per millimeter (in lp/mm), and the vertical axis represents the modulus of the OTF (e.g., the MTF value). As shown in FIGS. 3A and 3B, "T" represents the tangential MTF curve corresponding to a location and "S" represents the sagittal MTF curve corresponding to a location. "0.00 MM," "3.30 MM," "5.50 MM," "7.70 MM," and "10.78 MM" represent the distances between the locations measured to generate the MTF curves and the imaging center of the field of view of the lens system 100-1, respectively. As shown in FIG. 3A, curves 301, 303, 305, 307, and 309 may be the tangential MTF curves generated, at the wide-angle end of the lens system 100-1, based on locations whose distances away from the imaging center of the field of view of the lens system 100-1 are 0.00 mm, 3.3 mm, 5.5 mm, 7.7 mm, 10.78 mm, respectively. Curves 302, 304, 306, 308, and 310 may be the sagittal MTF curves generated, at the wide-angle end of the lens system 100-1, based on locations whose distances away from the imaging center of the field of view of the lens system 100-1 are 0.00 mm, 3.3 mm, 5.5 mm, 7.7 mm, 10.78 mm, respectively. As shown in FIG. 3B, curves 301', 303', 305', 307', and 309' may be the tangential MTF curves generated, at the telephoto end of the lens system 100-1, based on locations whose distances away from the imaging center of the field of view of the lens system 100-1 are 0.00 mm, 3.3 mm, 5.5 mm, 7.7 mm, 10.78 mm, respectively. Curves 302', 304', 306', 308', and 310' may be the sagittal MTF curves generated, at the telephoto end of the lens system 100-1, based on locations whose distances away from the imaging center of the field of view of the lens system 100-1 are 0.00 mm, 3.3 mm, 5.5 mm, 7.7 mm, 10.78 mm, respectively. As shown in FIGS. 3A and 3B, the MTF curves at the wide-angle end and at the telephoto end are relatively similar, the averages of the MTF values of the full field of view (e.g., when the spatial frequency is equal to 60 lp/mm as shown in FIG. 3A and/or FIG. 3B) at the wide-angle end and at the telephoto end are relatively large (e.g., larger than a threshold value 0.65), and the MTF curves are relatively smooth. As a result, the lens system 100-1 may achieve relatively high resolution and allow obtaining images with high quality. For example, the lens system 100-1 may be applicable to a camera with 12 megapixels and a ⅘-inch image plane.

Figure 4A:
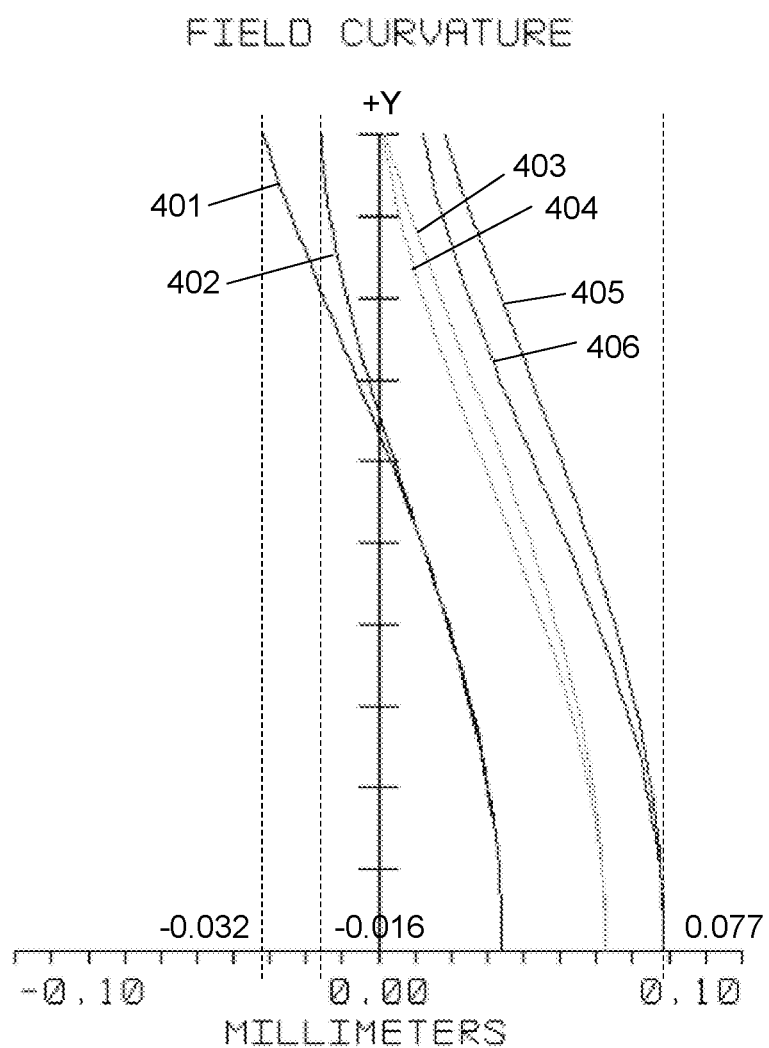
FIGS. 4A and 4B are schematic diagrams of field curvature of an exemplary lens system at a wide-angle end and a telephoto end, respectively, according to some embodiments of the present disclosure.
Figure 4B:
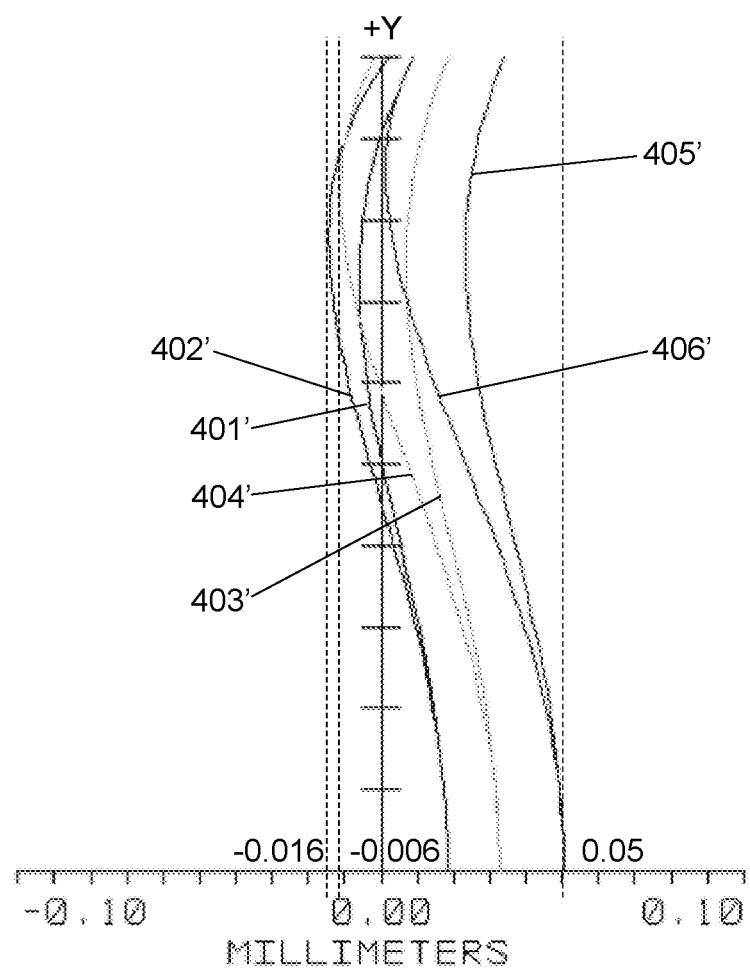

FIGS. 4A and 4B are schematic diagrams of field curvature of the lens system 100-1 at a wide-angle end and a telephoto end, respectively, according to some embodiments of the present disclosure.

Field curvature may be an optical aberration in which a planar object is projected to a curved (nonplanar) image and cannot be brought properly into focus on a flat image plane. This happens due to the curved nature of optical elements (e.g., the lenses) in the lens system, which project the image in a curved manner, rather than flat. A plane including the optical axis of the lens system and a point out of the optical axis may be referred to as a tangential plane. Incident rays on the tangential plane may be referred to as tangential rays. A plane that includes the optical axis of the lens system and is vertical to the tangential plane may be referred to as a sagittal plane. Incident rays on the sagittal plane may be referred to as sagittal rays. The diagram of field curvature may indicate the aberration of the tangential rays (e.g., tangential field curvature), the aberration of the sagittal rays (e.g., sagittal field curvature), and the correction ability of field curvature of the lens system.

As shown in FIGS. 4A and 4B, the horizontal axis relates to the incident height of rays from an object point with respect to the lens system 100-1, and the vertical axis relates to the distance between the actual image point of the object point and the ideal image point of the object point. As shown in FIG. 4A, curves 401, 403, and 405 are the field curvature curves of the tangential rays (also referred to as the tangential field curvature curves) with the wavelength of 486 nm, 587 nm, and 656 nm, respectively, at the wide-angle end of the lens system 100-1. Curves 402, 404, and 406 are the field curvature curves of the sagittal rays (also referred to as the sagittal field curvature curves) with the wavelength of 486 nm, 587 nm, and 656 nm, respectively, at the wide-angle end of the lens system 100-1. As shown in FIG. 4A, the sagittal field curvature occurring in the lens system 100-1 at the wide-angle end is limited to a range of −0.032 mm-0.077 mm, and the tangential field curvature occurring in the lens system 100-1 at the wide-angle end is limited to a range of −0.016 mm-0.077 mm. As shown in FIG. 4B, curves 401', 403', and 405' are the field curvature curves of the tangential rays (also referred to as the tangential field curvature curves) with the wavelength of 486 nm, 587 nm, and 656 nm, respectively, at the telephoto end of the lens system 100-1. Curves 402', 404', and 406' are the field curvature curves of the sagittal rays (also referred to as the sagittal field curvature curves) with the wavelength of 486 nm, 587 nm, and 656 nm, respectively, at the telephoto end of the lens system 100-1. As shown in FIG. 4B, the sagittal field curvature occurring in the lens system 100-1 at the telephoto end is limited to a range of –0.006 mm-0.05 mm, and the tangential field curvature occurring in the lens system 100-1 at the telephoto end is limited to a range of –0.015 mm-0.05 mm. As a result, the field curvature of the lens system 100-1 may be limited to a relatively small range, which indicates that the periphery of the image plane of the lens system 100-1 may have relatively high resolution.

Figure 5A:
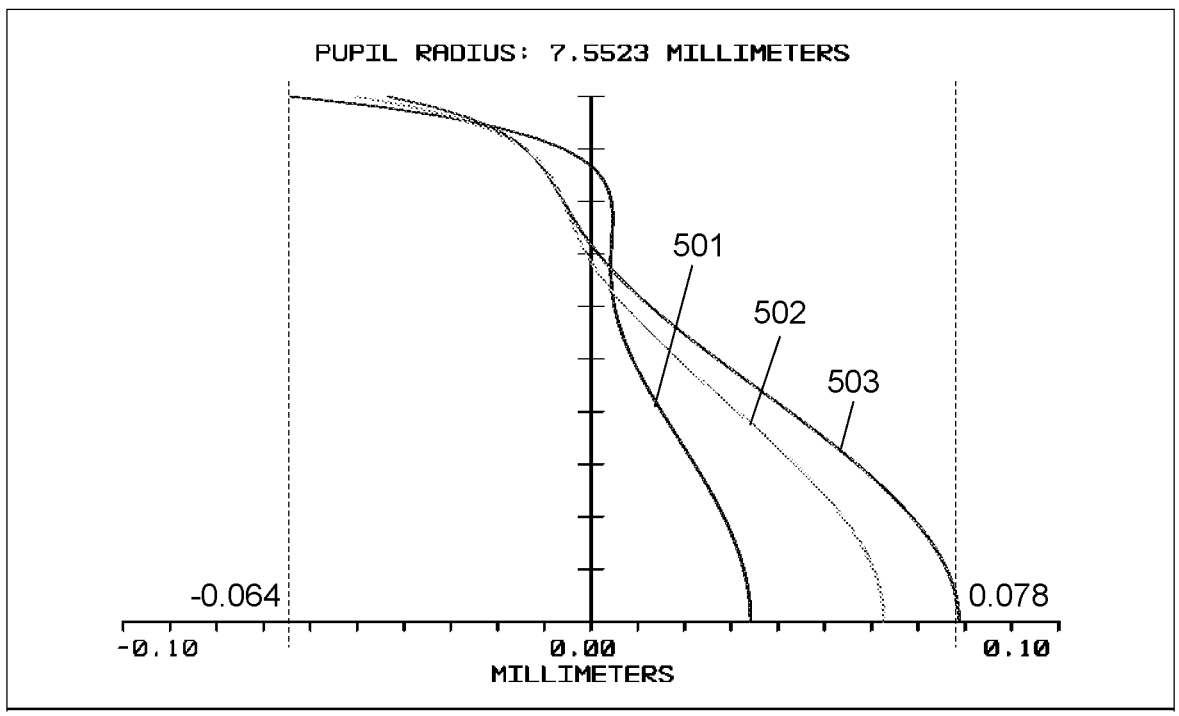
FIGS. 5A and 5B are schematic diagrams illustrating axial chromatic aberration of an exemplary lens system at a wide-angle end and a telephoto end, respectively, according to some embodiments of the present disclosure.
Figure 5B:
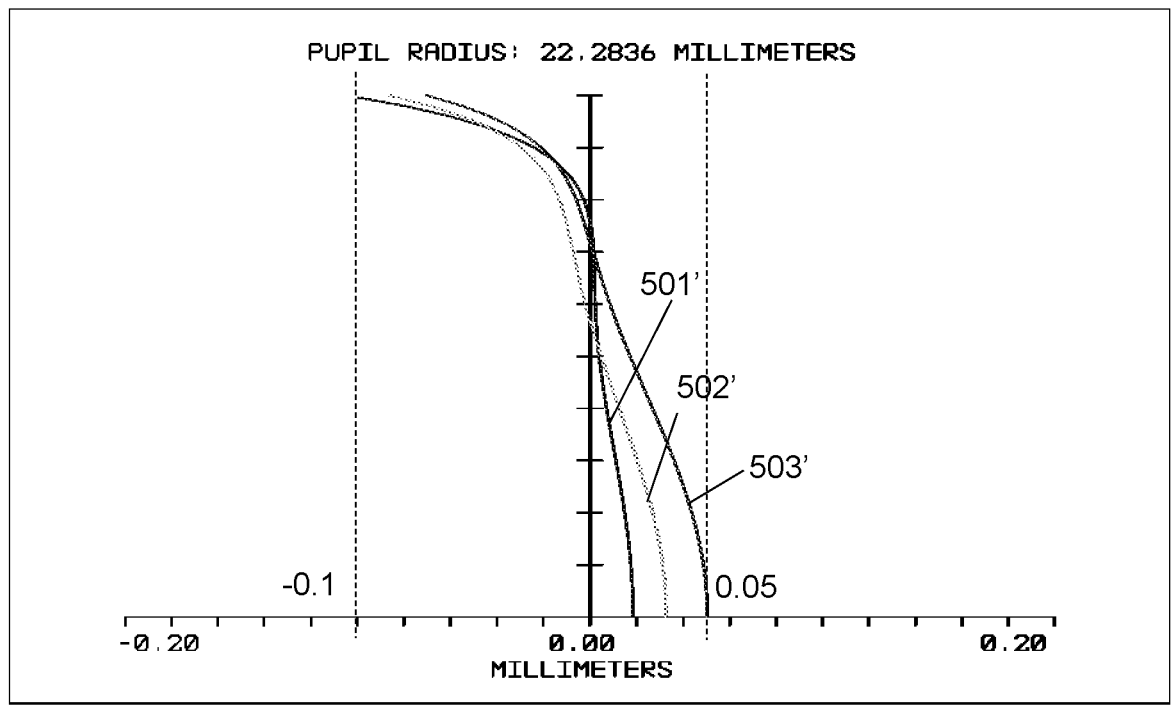

FIGS. 5A and 5B are schematic diagrams illustrating axial chromatic aberration of the lens system 100-1 at a wide-angle end and a telephoto end, respectively, according to some embodiments of the present disclosure.

When rays with different wavelengths from an object point at the optical axis of a lens system passes through the lens system, the rays with different wavelengths may have different image points because of axial chromatic aberration, which makes an image of the object point include colored spots and/or halos. This happens due to different focal lengths of the lens system corresponding to rays with different wavelengths.

As shown in FIGS. 5A and 5B, the horizontal axis relates to the incident height of rays from an object point with respect to the lens system 100-1, and the vertical axis relates to the distance between the actual image point of the object point and the ideal image point of the object point. As shown in FIG. 5A, curves 501-503 are the aberration curves of the rays with the wavelengths of 486 nm, 588 nm, and 656 nm, respectively, at the wide-angle end of the lens system 100-1. As shown in FIG. 5A, the axial chromatic aberration occurring in the lens system 100-1 at the wide-angle end is limited to a range of –0.064 mm-0.078 mm. As shown in FIG. 5B, curves 501'-503' are the aberration curves of the rays with the wavelengths of 486 nm, 588 nm, and 656 nm, respectively, at the telephoto end of the lens system 100-1. The pupil radius of the lens system 100-1 used to capture an object or an object point to generate curves 501-503 and 501'-503' is 7.5523 mm. As shown in FIG. 5B, the axial chromatic aberration occurring in the lens system 100-1 at the telephoto end is limited to a range of –0.1 mm-0.05 mm. As a result, the axial chromatic aberration of the lens system 100-1 may be limited to a relatively small range, which increases the definition of the center and the periphery of an image generated using the lens system 100-1.

Figure 6A:
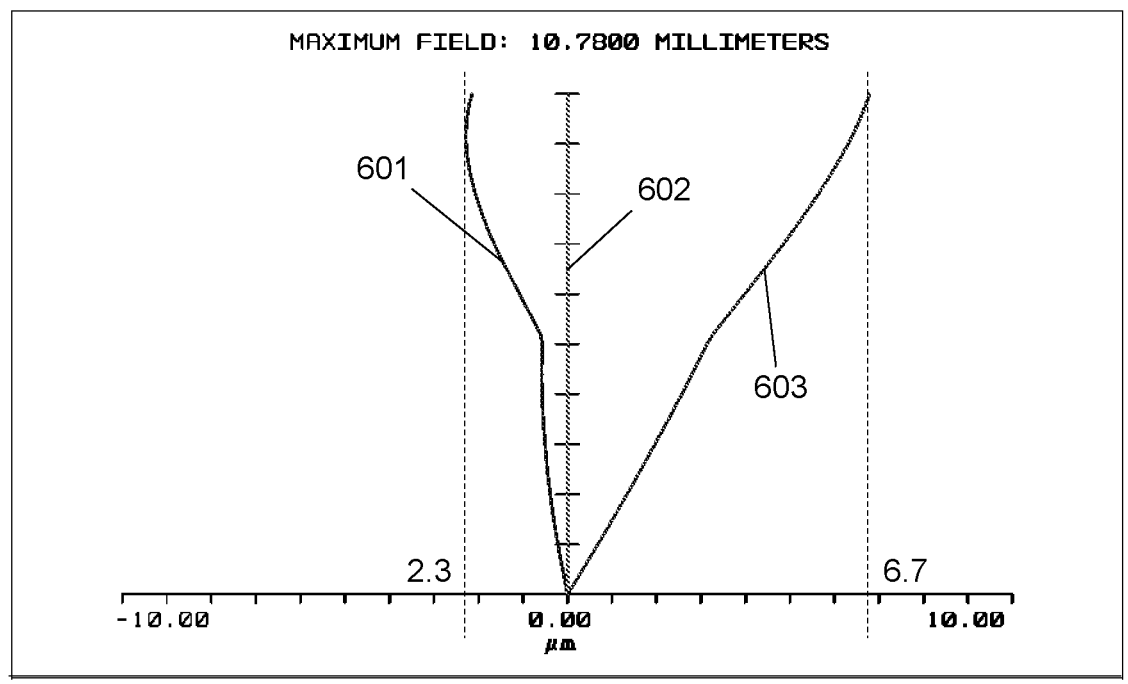
FIGS. 6A and 6B are schematic diagrams illustrating lateral chromatic aberration of an exemplary lens system at a wide-angle end and a telephoto end, respectively, according to some embodiments of the present disclosure.
Figure 6B:
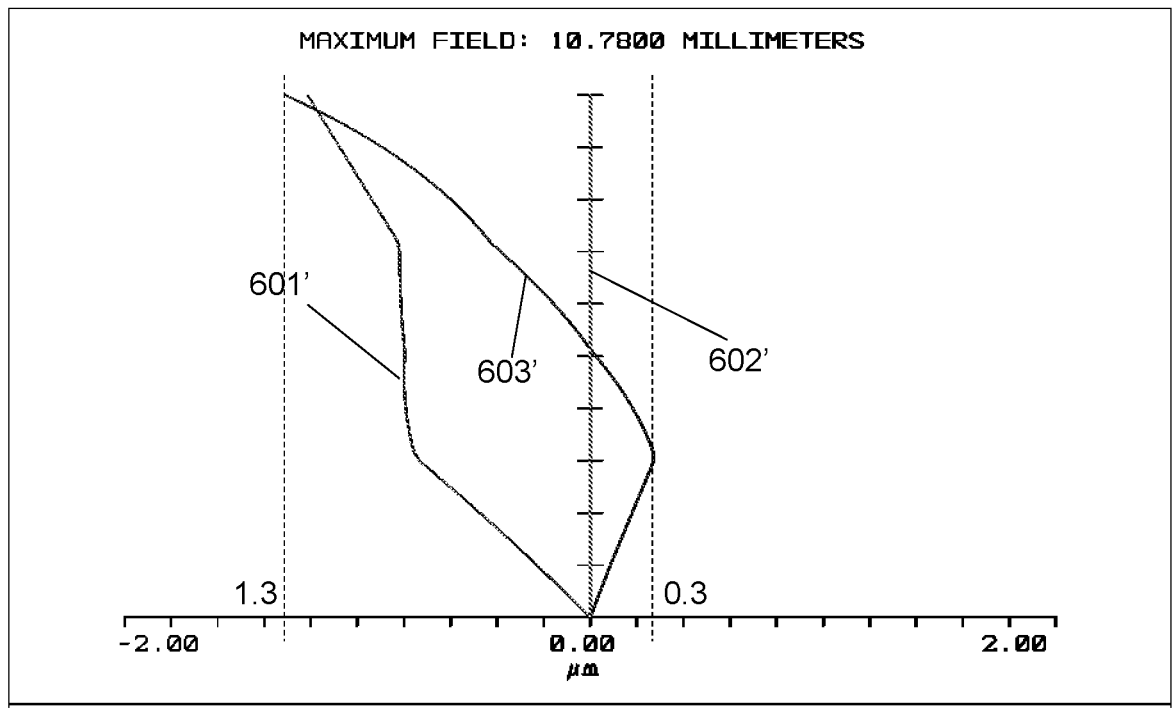

FIGS. 6A and 6B are schematic diagrams illustrating lateral chromatic aberration of the lens system 100-1 at a wide-angle end and a telephoto end, respectively, according to some embodiments of the present disclosure.

Lateral chromatic aberration may be an optical aberration in which an image of an object has colored edges and poor definition. This is caused by the fact that rays of different wavelengths are not equally refracted by the lens system, so that rays of different wavelengths from a same point (e.g., a point out of the optical axis of the lens system) corresponds to different image heights.

As shown in FIGS. 6A and 6B, the horizontal axis relates to the incident height of rays from an object point to the lens system 100-1, and the vertical axis relates to the distance between the actual image point of the object point and the ideal image point of the object point. The maximum field of the lens system 100-1 used to capture an object or an object point to generate curves 601-603 and 601'-603' is 10.7800 mm. As shown in FIG. 6A, curves 601-603 are the aberration curves of the rays with the wavelengths of 486 nm, 588 nm, and 656 nm, respectively, at the wide-angle end of the lens system 100-1. Curves 601 and 603 are generated by determining curve 602 as a reference curve. In this case, at the wide-angle end, it is assumed that the actual image point of the object point and the ideal image point of the object point corresponding to the rays with the wavelengths of 588 nm is overlapped at any incident height. As shown in FIG. 6A, the lateral chromatic aberration occurring in the lens system 100-1 at the wide-angle end is limited to a range of –0.0023 mm-0.0067 mm. As shown in FIG. 6B, curves 601'-603' are the aberration curves of the rays with the wavelengths of 486 nm, 588 nm, and 656 nm, respectively, at the telephoto end of the lens system 100-1. Curves 601' and 603' are generated by determining curve 602' as a reference curve. In this case, at the telephoto end, it is assumed that the actual image point of the object point and the ideal image point of the object point corresponding to the rays with the wavelengths of 588 nm is overlapped at any incident height. As shown in FIG. 6B, the lateral chromatic aberration occurring in the lens system 100-1 at the telephoto end is limited to a range of –0.0013 mm-0.0003 mm. As a result, the lateral chromatic aberration of the lens system 100-1 may be limited to a relatively small range, which increases the definition of the center and the periphery of an image generated using the lens system 100-1.

As illustrated above, the lens system 100-1 may well correct the aberrations, such as spherical aberration, coma aberration, astigmatism, field curvature, distortion, axial chromatic aberration, or lateral chromatic aberration. The lens system 100-1 may have a larger aperture (e.g., F1.5) and higher resolution (e.g., applicable to a camera with 12 megapixels). The lens system 100-1 may be applicable to capturing ultra high-definition (HD) images and/or video in all weather conditions in the field of, for example, security monitoring.

Figure 7:
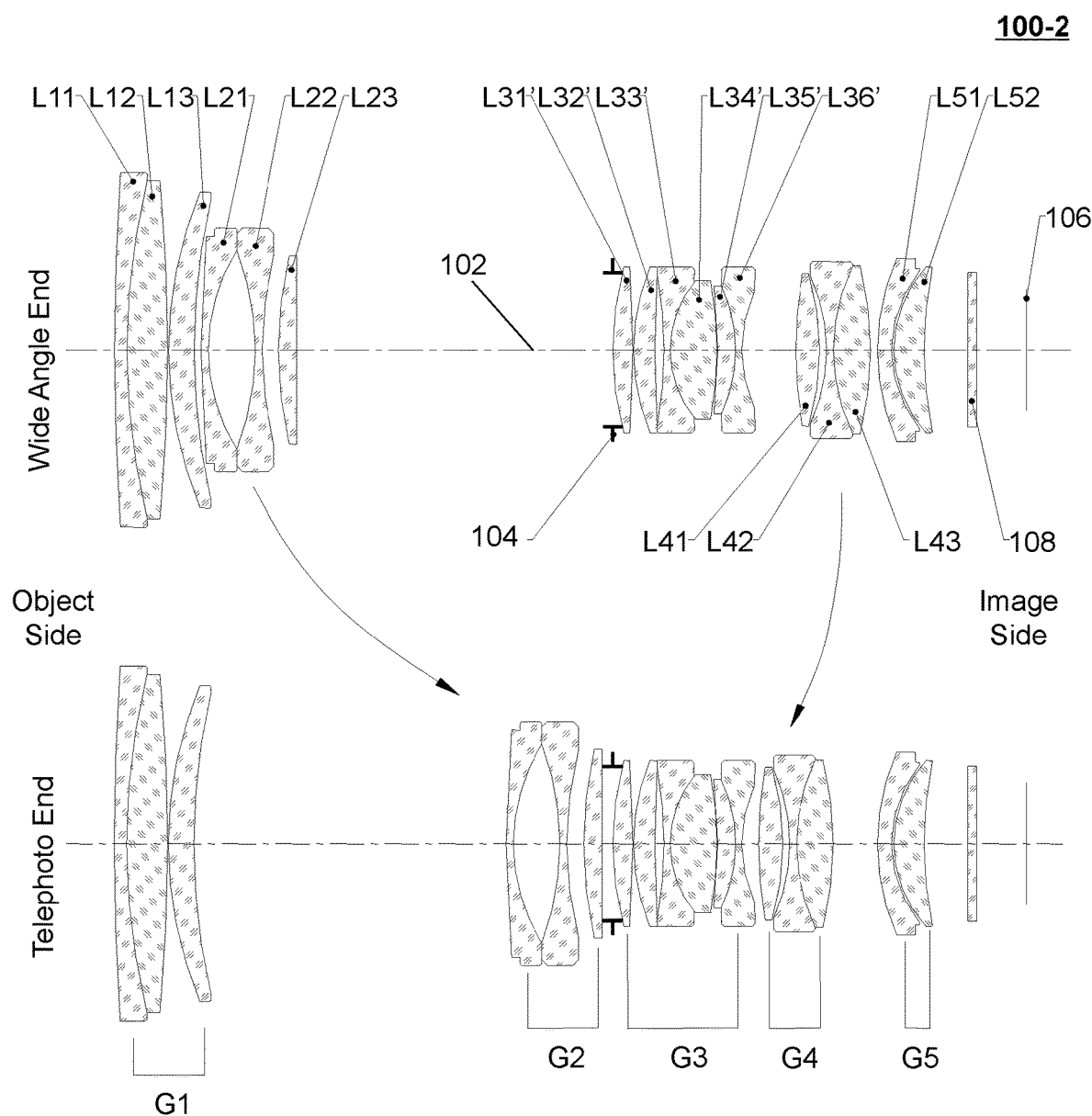
FIG. 7 is a schematic diagram illustrating an exemplary lens system according to some embodiments of the present disclosure.

FIG. 7 is a schematic diagram illustrating an exemplary lens system according to some embodiments of the present disclosure. In some embodiments, the lens system 100-2 in FIG. 7 may be an example of the lens system 100 in FIG. 1.

As shown in FIG. 7, the lens system 100-2 may include a first lens group G1 having positive refractive power, a second lens group G2 having negative refractive power, an aperture stop 104, a third lens group G3 having positive refractive power, a fourth lens group G4 having positive refractive power, a fifth lens group G5 having positive refractive power, and one or more color filters 108 in sequence from an object side to an image side along an optical axis 102 of the lens system 100-2. G1, G3, and G5 may be fixed relative to the image plane 106 during the magnification change of the lens system 100-2. G2 and G4 may be adjustable along the optical axis 102 of the lens system 100-2 to adjust the focal length of the lens system 100-2. As shown in FIG. 7, the lens system 100-2 may limit a third adjusting line for adjusting G2 along the optical axis 102 and a fourth adjusting line for adjusting G4 along the optical axis 102. When G2 is adjusted along the optical axis 102 to the object-side end of the third adjusting line and G4 is adjusted along the optical axis 102 to the image-side end of the fourth adjusting line, the lens system 100-2 may be at the wide-angle end. When G2 is adjusted along the optical axis 102 to the image-side end of the third adjusting line and G4 is adjusted along the optical axis 102 to the object-side end of the fourth adjusting line, the lens system 100-2 may be at the telephoto end. In some embodiments, the lens system lens 100-2 may satisfy formulas (4)-(6).

In some embodiments, G3 may include a first lens sub-group G31 having positive refractive power, a second lens sub-group G32, and a third lens sub-group G33 in sequence from the object side to the image side along the optical axis 102 of the lens system 100-2. G31 may include a biconvex lens L31' having positive refractive power and a meniscus lens L32' having positive refractive power in sequence from the object side to the image side along the optical axis 102 of the lens system 100-2. The object-side surface of L32' may be a convex surface (e.g., as shown in FIG. 7) or a concave surface. If the object-side surface of L32' is the concave surface, L31' and L32' may be cemented together. G32 may include a biconcave lens L33' having negative refractive power and a biconvex lens L34' having positive refractive power that are cemented together in sequence from the object side to the image side along the optical axis 102 of the lens system 100-2. G33 may include a meniscus lens L35' having positive refractive power and a biconcave lens L36' having negative refractive power in sequence from the object side to the image side along the optical axis 102 of the lens system 100-2. The object-side surface of L35' may be a convex surface or a concave surface (e.g., as shown in FIG. 7). If the object-side surface of L35' is the concave surface, L35' and L36' may be cemented together.

In the lens system 100-2, the structure of G1, G2, G4, and G5 may be similar to the lens system 100-1 in FIG. 2 and is not described in FIG. 7.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, the lens systems (e.g., the lens system 100, the lens system 100-1, the lens system 100-2) described in the present disclosure may be used in an imaging device, such as a digital camera, a web camera, a video gaming console equipped with a web camera, a video camera, a motion picture camera, a broadcasting camera, or a closed circuit television (CCTV) camera. In the imaging device, an image sensor, such as a charge-coupled device (CCD) or a complementary metal oxide semiconductor (CMOS), may receive rays that are reflected by an object and pass through the lens system, and transform the rays from light signals to electronic signals. An analog-digital converter (ADC) in the imaging device may transform the electronic signals to digital signals. Image processing circuits in the imaging device may process the digital signals to generate an image of the object. A storage medium in the imaging device may record the generated image. With the imaging device, a still image, a moving image, or a video may be captured. The imaging device that is provided with the lens system in the present disclosure may achieve a high image stabilization effect and allow obtaining high quality images.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. A lens system comprising a first lens group, a second lens group, a third lens group, a fourth lens group, and a fifth lens group in sequence from an object side to an image side along an optical axis of the lens system, wherein:
   at least one of the first lens group, the second lens group, the third lens group, the fourth lens group, and the fifth lens group is adjustable along the optical axis of the lens system to adjust a focal length of the lens system; and
   the lens system satisfies $$-1.33 \leq \frac{f_2}{(f_w \cdot f_t)^{\frac{1}{2}}} \leq -1.03, 1.56 \leq \frac{f_3}{(f_w \cdot f_t)^{\frac{1}{2}}} \leq 1.86, 1.21 \leq \frac{f_4}{(f_w \cdot f_t)^{\frac{1}{2}}} \leq 1.51,$$

wherein $f_2$ represents a focal length of the second lens group, $f_3$ represents a focal length of the third lens group, $f_4$ represents a focal length of the fourth lens group, $f_w$ represents a focal length of the lens system at a wide-angle end, and $f_t$ represents a focal length of the lens system at a telephoto end.

2. The lens system of claim 1, wherein the first lens group has positive refractive power, the second lens group has negative refractive power, the third lens group has positive refractive power, the fourth lens group has positive refractive power, and the fifth lens group has positive refractive power.

3. The lens system of claim 1, wherein the first lens group includes a first meniscus lens having negative refractive power, a biconvex lens having positive refractive power, and a second meniscus lens having positive refractive power in sequence from the object side to the image side along the optical axis of the lens system, each of the first meniscus lens and the second meniscus lens being with a convex surface toward the object side of the lens system.

4. The lens system of claim 1, wherein the second lens group includes a first lens having negative refractive power, a biconcave lens having negative refractive power, and a second lens having positive refractive power in sequence from the object side to the image side along the optical axis of the lens system, the first lens being with a concave surface toward the image side of the lens system, the second lens being with a convex surface toward the object side of the lens system.

5. The lens system of claim 1, wherein the third lens group includes a first lens sub-group having positive refractive power, a second lens sub-group, and a third lens sub-group in sequence from the object side to the image side along the optical axis of the lens system.

6. The lens system of claim 5, wherein:
the first lens sub-group includes a first biconvex lens having positive refractive power, a first biconcave lens having negative refractive power, and a second biconvex lens having positive refractive power that are cemented together in sequence from the object side to the image side along the optical axis of the lens system;
the second lens sub-group includes a second biconcave lens having negative refractive power and a third biconvex lens having positive refractive power that are cemented together in sequence from the object side to the image side along the optical axis of the lens system; and
the third lens sub-group includes a fourth biconvex lens having positive refractive power and a third biconcave lens having negative refractive power that are cemented together in sequence from the object side to the image side along the optical axis of the lens system.

7. The lens system of claim 5, wherein:
the first lens sub-group includes a first biconvex lens having positive refractive power and a meniscus lens having positive refractive power in sequence from the object side to the image side along the optical axis of the lens system;
the second lens sub-group includes a first biconcave lens having negative refractive power and a second biconvex lens having positive refractive power that are cemented together in sequence from the object side to the image side along the optical axis of the lens system; and
the third lens sub-group includes a third biconvex lens having positive refractive power and a second biconcave lens having negative refractive power that are cemented together in sequence from the object side to the image side along the optical axis of the lens system.

8. The lens system of claim 7, wherein an object-side surface of the meniscus lens in the first lens sub-group is a convex surface.

9. The lens system of claim 7, wherein an object-side surface of the meniscus lens in the first lens sub-group is a concave surface, and the first biconvex lens and the meniscus lens in the first lens sub-group are cemented together.

10. The lens system of claim 1, wherein the fourth lens group includes a first biconvex lens having positive refractive power and a fourth lens sub-group in sequence from the object side to the image side along the optical axis of the lens system.

11. The lens system of claim 10, wherein the fourth lens sub-group includes a biconcave lens having negative refractive power and a second biconvex lens having positive refractive power that are cemented together in sequence from the object side to the image side along the optical axis of the lens system.

12. The lens system of claim 1, wherein the fifth lens group includes a third meniscus lens having negative refractive power and a fourth meniscus lens having positive refractive power in sequence from the object side to the image side along the optical axis of the lens system, each of the third meniscus lens and the fourth meniscus lens being with a convex surface toward the object side of the lens system.

13. The lens system of claim 1, wherein lenses in the lens system are spherical lenses.

14. The lens system of claim 1, wherein the lens system includes at least one aspherical lens.

15. The lens system of claim 1, further comprising an aperture stop between the second lens group and the third lens group.

16. The lens system of claim 1, wherein a size of an image plane of the lens system based on the first lens group, the second lens group, the third lens group, the fourth lens group, and the fifth lens group is ⅔ inch.

17. The lens system of claim 1, wherein a maximum aperture corresponding to focal lengths from the wide-angle end to the telephoto end is constant based on the first lens group, the second lens group, the third lens group, the fourth lens group, and the fifth lens group.

18. The lens system of claim 1, wherein the second lens groups and the fourth lens group are adjustable along the optical axis of the lens system to adjust the focal length of the lens system.

19. An imaging device comprising the lens system claimed in claim 1.

* * * * *